Figures 1, 2:
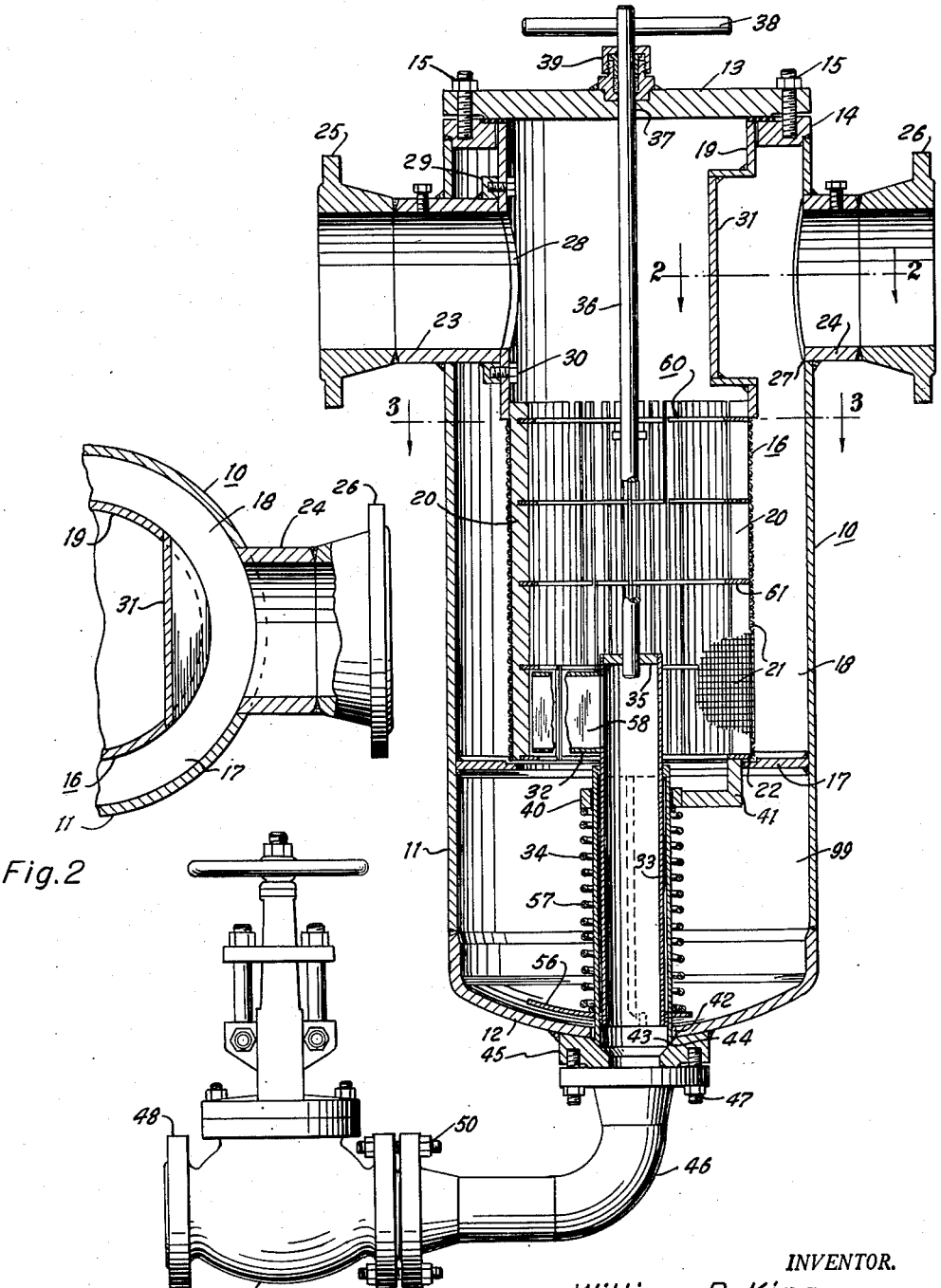

May 20, 1958 W. R. KING 2,835,390
FLUID STRAINERS
Filed Sept. 27, 1954 5 Sheets-Sheet 1

INVENTOR.
William R. King
BY Ashley & Ashley
ATTORNEYS

May 20, 1958 W. R. KING 2,835,390
FLUID STRAINERS
Filed Sept. 27, 1954 5 Sheets-Sheet 2
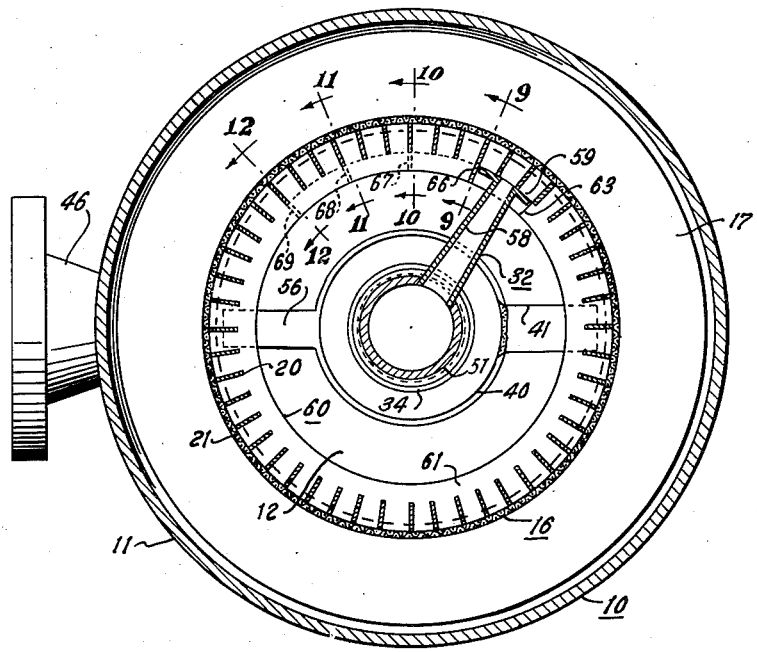
Fig. 3
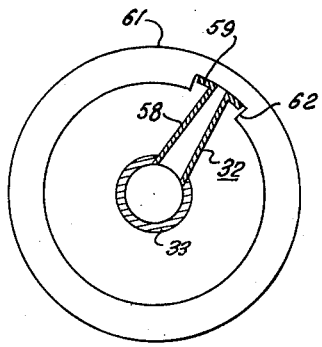
Fig. 4
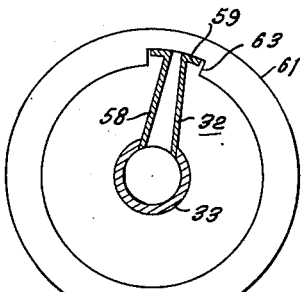
Fig. 5
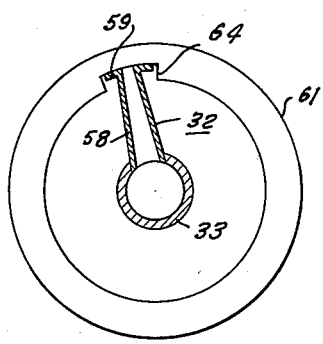
Fig. 6
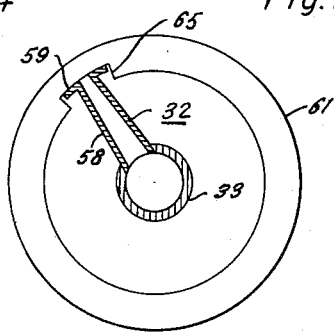
Fig. 7
INVENTOR.
William R. King
BY
ATTORNEYS May 20, 1958 W. R. KING 2,835,390
FLUID STRAINERS
Filed Sept. 27, 1954 5 Sheets-Sheet 3

INVENTOR.
William R. King
BY
ATTORNEYS

May 20, 1958 W. R. KING 2,835,390
FLUID STRAINERS
Filed Sept. 27, 1954 5 Sheets-Sheet 4
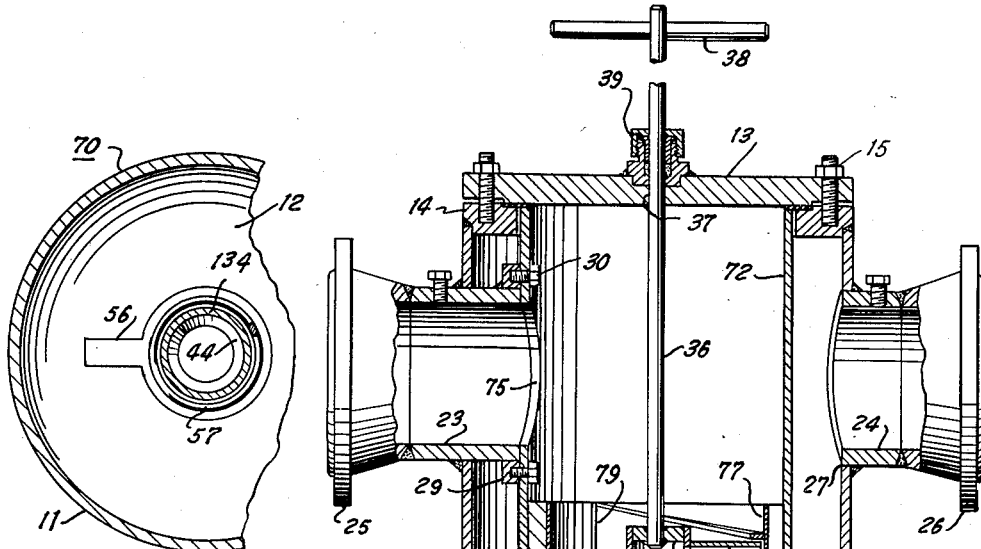
Fig. 15
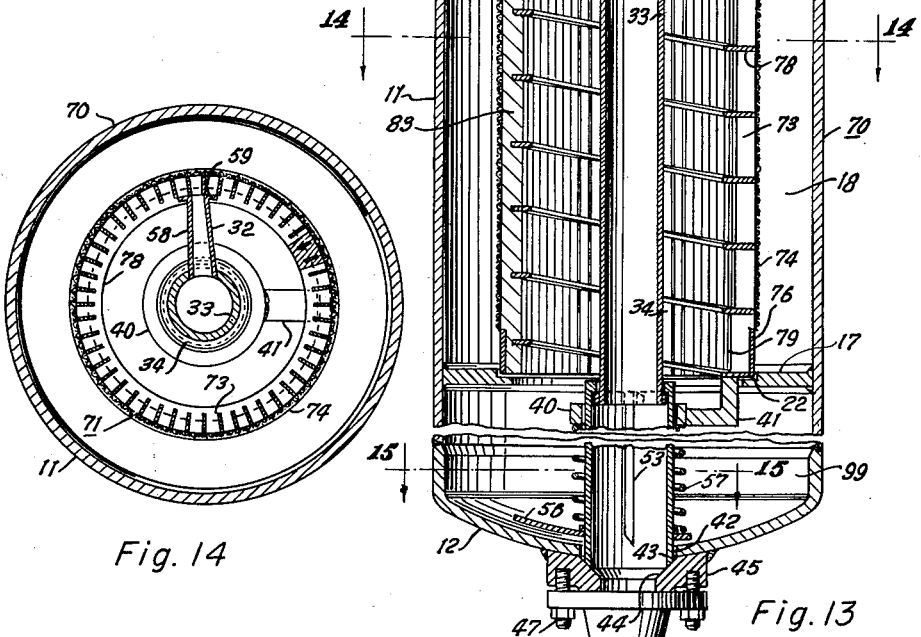
Fig. 14
Fig. 13
INVENTOR.
William R. King
BY
ATTORNEYS May 20, 1958 W. R. KING 2,835,390
FLUID STRAINERS
Filed Sept. 27, 1954 5 Sheets-Sheet 5
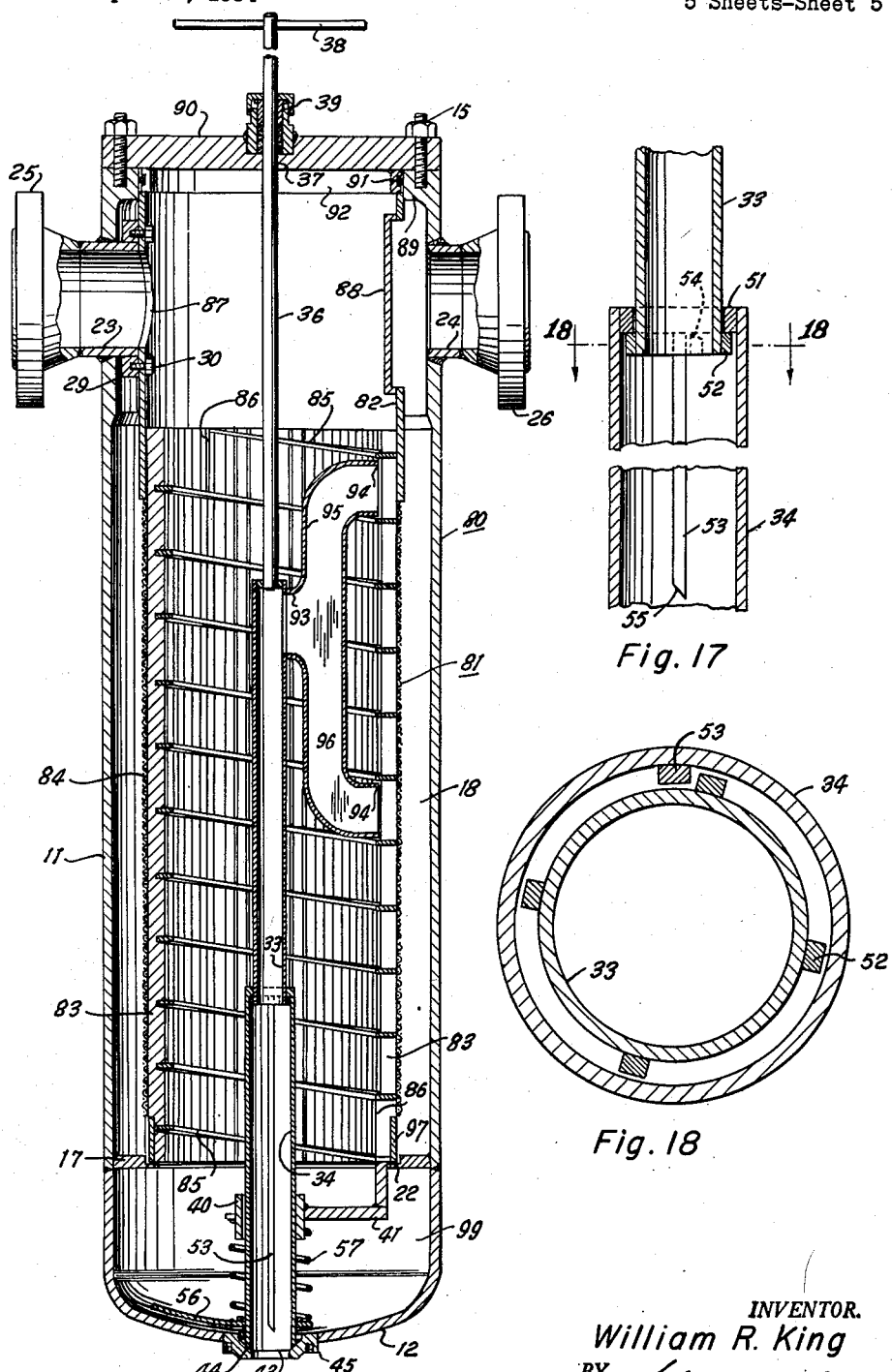
Fig. 16  Fig. 17  Fig. 18
INVENTOR.
William R. King
BY
ATTORNEYS United States Patent Office 2,835,390
Patented May 20, 1958

2,835,390
FLUID STRAINERS
William R. King, Longview, Tex.
Application September 27, 1954, Serial No. 458,545
16 Claims. (Cl. 210—411)

This invention relates to new and useful improvements in fluid strainers and more particularly to strainers having cleaning means incorporated therein.

One object of the invention is to provide an improved fluid strainer having cleaning means mounted therein for operation during and without interference with the functioning of the strainer.

An important object of the invention is to provide an improved fluid strainer having cleaning means for its strainer element and guide means associated therewith to assure thorough cleaning of the strainer element whereby the cleaning means may be relatively small in comparison to said screen so as to cover little area thereof at any one time during operation.

A particular object of the invention is to provide an improved fluid strainer having a screen and cleaning means therefor mounted in a chamber so as to be readily removable together from the chamber whenever desired.

Another object of the invention is to provide an improved fluid strainer, of the character described, wherein its cleaning means is arranged so that the pressure of the fluid is utilized to create a reverse flow through its screen for cleaning same and so that the reverse flow is confined to a small area of the screen at any one time as the cleaning means traverses the entire area of the screen so as to increase the efficiency thereof and reduce interference with the function of the strainer to a minimum.

A further object of the invention is to provide an improved fluid strainer, of the character described, having means therein for accumulating solids or sedimentation strained from the fluid and means actuated by the cleaning means for removing the accumulated solids and foreign matter.

Another object of the invention is to provide an improved fluid strainer, of the character described, wherein the guide means extends substantially throughout the length of the screen so that the cleaning means may traverse the entire area of said screen without interrupting the operation of the strainer.

A construction designed to carry out the invention will be hereinafter described, together with other features of the invention.

Figure 8:
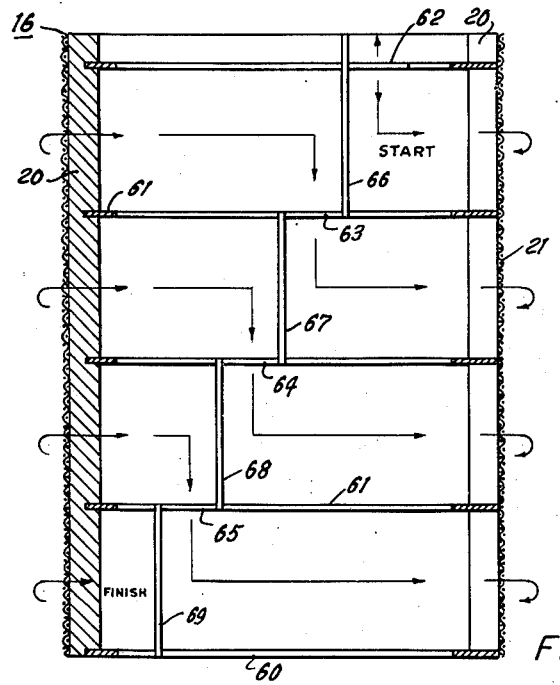
Figure 9:
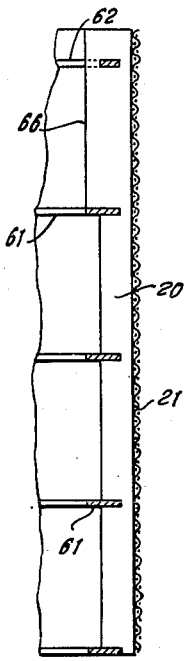
Figures 10, 11, 12:
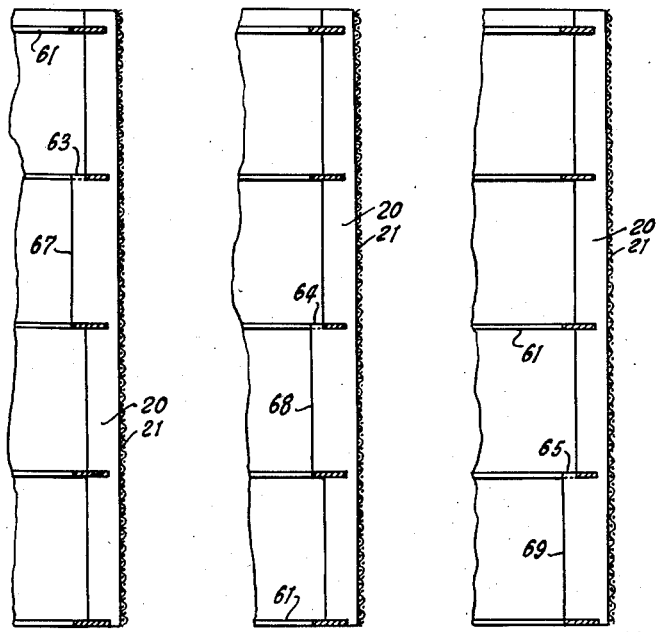

The invention will be more readily understood from a reading of the following specification and by reference to the accompanying drawings, wherein examples of the invention are shown, and wherein:

Fig. 1 is a longitudinal, sectional view of a fluid strainer constructed in accordance with the invention, Fig. 2 is a horizontal, cross-sectional view, taken on the line 2—2 of Fig. 1, Fig. 3 is a horizontal, cross-sectional view, taken on the line 3—3 of Fig. 1, Figs. 4, 5, 6 and 7 are schematic plan views, partly in section, showing the movement of the cleaning nozzle from one flight to an adjacent flight of the guide track, Fig. 8 is an enlarged, longitudinal, schematic view of the strainer screen and guide track, showing the relation of the track flights to one another, Figs. 9, 10, 11 and 12 are transverse, vertical, sectional views, taken on the respective lines 9—9, 10—10, 11—11 and 12—12 of Fig. 3, Fig. 13 is a longitudinal sectional view of a strainer having a modified cylinder embodying the principles of the invention, Fig. 14 is a horizontal, cross-sectional view, taken on the line 14—14 of Fig. 13, Fig. 15 is a horizontal, cross-sectional view, taken on the line 15—15 of Fig. 13, Fig. 16 is a longitudinal, sectional view of a strainer having a further modified cylinder, Fig. 17 is an enlarged, transverse, vertical, sectional view of the lower portion of the cleaning tube and its sleeve valve, and Fig. 18 is a horizontal, cross-sectional view, taken on the line 18—18 of Fig. 17.

In the drawings, the numeral 10 designates the upright tank or vessel of a strainer for fluids, such as gasoline, crude oil, water or gas, having a cylindrical side wall 11, a dished bottom or lower head 12 and a flat top or upper head 13. The side wall has an internal, peripheral flange 14 at its upper end and the head is removably fastened thereto in overlying relation by suitable studs and bolts 15. A cylinder 16 is removably mounted concentrically within the tank on an internal peripheral flange or annular partition 17 adjacent and spaced from the bottom 12 and extends upwardly from this flange to the head 13 whereby an annular, longitudinal space or chamber 18 is formed in said tank between its side wall 11 and the cylinder above said flange and an accumulation chamber or sump 99 therebelow. The cylinder is open-ended and includes an imperforate upper portion or cylindrical partition 19, having its upper end engaged within the flange 14 and closed by the upper head, and equally-spaced, longitudinal bars or members 20, depending from the lower end of the partition in circumferential relation for supporting an encircling screen or foraminous strainer element 21. An annular recess or seat 22 is formed on the inner periphery of the lower flange 17 for receiving the lower ends of the longitudinal bars and screen to center the cylinder 16 within the tank. It is noted that the screen 21 and its supporting bars 20 are of greater length than the partition so as to comprise more than one-half of the cylinder, which has its open lower end communicating with the sump 99 at the lower portion of the tank below the lower flange.

Inlet and outlet collars 23 and 24, which may be diametrically-opposed, extend laterally outward from the upper portion of the side wall 11 and have external flanges 25 and 26, respectively, on their outer ends for connection with inlet and outlet pipes or other conduits (not shown). The outlet collar 24 communicates with the annular chamber 18 and has its inner end secured in an outlet opening 27 in the side wall, while the inlet collar 23 is of greater length and extends through said wall and chamber into communication with the cylinder 16. An inlet opening 28 is formed in the partition 19 for registration with the inlet collar which has an external flange 29 for receiving fastening bolts 30 extending through said partition in surrounding relation to the opening. As shown by the numeral 31 (Fig. 2), the partition may be inwardly offset or recessed opposite the outlet opening 27 to increase the area of the chamber 18 immediately adjacent said opening for accommodating the flow of fluid. Manifestly, the fluid is admitted to the cylinder through the inlet opening 28 and must pass outwardly through the screen 21 in order to enter the annular chamber for discharge through the outlet opening. The interstices of the screen are of sufficient size to accommodate the flow of fluid therethrough and prevent the passage of solids or sedimentation. It is noted that the entire cylinder 16 is removable through the upper end of the tank upon removal of the upper head and disconnection of the fastening bolts 30.

For cleaning the screen 21 when its interstices become clogged with solids or sedimentation, cleaning means is provided for reversing the flow through said screen and includes a transverse nipple or nozzle 32 projecting radially from the upper end portion of a cylindrical member or tube 33 suspended axially in the cylinder 16 and having a telescoping member or sleeve 34 depending therefrom into the sump 99, at lower portion of the tank. A circular plate or disk 35 closes the upper end of the tube and an operating rod or stem 36 extends upwardly from the disk through an axial opening 37 in the upper head 13. The rod has a suitable handle 38 on its upper end and a stuffing box 39 packs off between said rod and the opening 37, whereby the tube 33 and its nozzle 32 may be reciprocated and rotated within the cylinder by exterior manipulation of said rod during use of the strainer. For centering the sleeve 34, a guide collar 40 is suspended below the cylinder by an angular hanger or bracket 41 depending from the lower end of said cylinder. When the cylinder is seated on the lower flange 17, the hanger extends below the flange so as to position the guide collar in the lower portion of the tank. An axial opening 42 is formed in the dished bottom 12 for receiving the lower end of the sleeve which is bevelled, as shown by the numeral 43, complementary to an internal annular seat 44 formed in the bore of a collar 45 secured externally to said bottom and surrounding the opening. A flanged elbow 46 has one end connected to the collar 45 by studs and nuts 47 and its opposite end to one of the flanges 48 of a suitable valve 49 by studs and nuts 50. The opposite flange of the valve is open to the atmosphere or may be connected to a discharge pipe (not shown) whereby, upon opening of said valve, the fluid in the chamber 18 flows through the nozzle 32, tube 33, sleeve 34, collar 45, elbow 46 and said valve to create a reverse flow through the screen 21 for removing solids or sedimentation from the interstices thereof. Of course, the reverse flow is due to the pressure of the fluid being greater than atmospheric pressure or the pressure in the discharge pipe and the tube and sleeve coact to provide a conduit for the nozzle.

As shown most clearly in Figs. 17 and 18, an annular collar 51 is secured in the upper end of the sleeve for coacting engagement with external, spaced, radial lugs 52 on the lower end of the tube to connect said tube and sleeve and permit lifting of said sleeve by said tube and relative reciprocal movement of the latter. For transmitting rotation from the tube 33 to the sleeve 34, an elongated lug or rib 53 extends longitudinally of the sleeve from its collar 51 and is adapted to be engaged by one of the tube lugs. If desired, the rib 53 may terminate short of the end of the sleeve whereby the tube may be turned relative to said sleeve when the lugs 52 are positioned below said rib upon downward reciprocation of said tube. In order to prevent hanging of the lugs and rib upon upward reciprocation of the tube, the lower ends of said lugs and ribs may be bevelled as shown by the numerals 54 and 55 (Fig. 17). The elongation of the rib 53 permits rotation of the sleeve with the tube throughout the major portion of the telescoping movement of said tube. In addition to functioning as a valve member coacting with the valve seat 44, the sleeve preferably carries an agitator blade 56 adjacent its lower end. The blade is arced or curved complementary to the dished bottom 12 and, due to the coacting lugs and rib, is adapted to be rotated by turning of the rod 36, tube 32 and sleeve 34 for agitating or stirring the solids or sedimentation accumulated in the sump 99. Upon lifting of the sleeve and disengagement of its bevelled lower end 43 from the valve seat, the pressure of the fluid creates a flow from the sump through the opening 42, collar 45, elbow 46 and valve 49 to carry off the solids or sedimentation which tend to accumulate in said sump. Preferably, a coiled spring 57 is confined on the sleeve between the hanger collar 40 and the blade 56 to maintain the lower end of of said sleeve in engagement with the valve seat 44.

The nozzle 32 is rectangular in cross-section, being of greater height than width, and has outwardly-converging side walls 58 whereby the outer end or tip is of less width than the inner end or base of said nozzle (Figs. 3–7). An arcuate, laterally-projecting flange or head 59 is formed on the tip of the nozzle which is adapted to engage the inner longitudinal margins of the upright supporting bars 20 of the screen 21 and which is of a width substantially equal to the space between adjacent bars. The head is of sufficient width to overlie adjacent spaces when the nozzle is in registration with the space therebetween whereby a minimum area of the screen communicates with said nozzle in any position of the latter. Due to the rod 36 and its handle 38, the nozzle is adapted to be reciprocated and rotated for traversing the entire area of the screen. A guide track or means 60 is provided for assuring complete traversal of the screen by the nozzle 32 and includes a plurality of individual, transverse, annular track members or guide rings 61 disposed in equally-spaced, superimposed relation. The rings extend circumferentially of and internally from the screen so as to intersect the upright bars at substantially right angles and are of a width greater than the width of said bars so as to project inwardly thereof for supporting the nozzle head 59. In addition, the intersecting bars and rings coact to divide the spaces therebetween into a plurality of separate chambers for collecting solids or sedimentation between the screen and track as well as to divide said screen into separate sections. Manifestly, the nozzle is adapted to communicate individually with the chambers and screen sections thereof. As shown in Fig. 1, the space between adjacent rings 61 is slightly greater than the height of the nozzle whereby said nozzle is slidably confined between said rings.

In order to permit movement of the nozzle from one ring to another, recesses 62, 63, 64 and 65 are formed in the internal peripheral edge portions of all of the rings except the lowermost one and each recess is positioned immediately clockwise of one of the bars 20 (Fig. 3). The recesses are complementary to and slightly larger than the nozzle head so as to permit movement of said head therethrough and are offset or staggered relative to one another a distance equal to their length. As shown most clearly in Figs. 4–8, the recess 62 of the uppermost ring is offset clockwise of the recess 63 of the adjacent underlying ring, said recess 63 being offset clockwise of the recess 64 of the next ring and said recess 64 being offset clockwise of the recess 65 of the next ring. Upright partitions or stops 66, 67, 68 and 69 are provided between the rings at the adjacent ends of the recesses 62, 63, 64 and 65, respectively, by increasing the width of the bars below and at said ends to an extent equal to the width of the rings 61. It is noted that the uppermost ring is disposed below the upper ends of the upright bars and that the stop 66 extends above said ring at the counter-clockwise end of its recess 62. Since the stops 66, 67 and 68 are disposed above and at the clockwise ends of the recesses 63, 64, and 65 (Figs. 3 and 8), said stops limit clockwise rotation of the nozzle 32 and guide its head 59 into registration with said recesses for downward movement therethrough. All of the stops function to limit counter-clockwise rotation and to guide upward movement of the nozzle head. The travel of the nozzle and its head in traversing the screen is shown by arrows in Fig. 8, and said nozzle may be withdrawn entirely from the cylinder by upward movement through the recess 62 so that the sleeve 34 can be lifted and disengaged from the valve seat 44 when it is desirable to flush the sump 99.

Upon counter-clockwise rotation of the nozzle, its head engages the upper end of the stop 66 and is alined with the recess 62 for downward movement therethrough and subsequent clockwise rotation between the two uppermost rings. The nozzle head is registered with the recess 63 by engagement with the opposite side of the stop for downward movement through said recess and clockwise rotation between the second and third rings. Engagement with the stop 67 permits lowering of the nozzle head through the recess 64 and clockwise rotation between the third and fourth rings and, finally, the stop 68 directs said head through the recess 65 for clockwise rotation between the fourth and lowermost rings. Upward traversal is accomplished by reverse or counter-clockwise rotation and movement of the nozzle head upwardly through the recesses. It is noted that the rings 61 provide coacting flights for the substantially continuous guide track 60.

In Figs. 13, 14 and 15, a similar fluid strainer 70 having a modified cylinder 71 is shown. Since the major portions of the strainers are substantially identical, like numerals have been applied to and identify like elements. The cylinder includes a similar, imperforate upper portion or cylindrical partition 72, upright supporting members or bars 73, and an encircling screen or foraminous strainer element 74, and said cylinder is removably supported and centered by having its ends engaged in the upper collar 14 and in the seat 22 of the lower flange 17. An opening 75 is formed in the partition 72 for registration and connection with the collar 23 by its flange 29 and bolts 30. The cleaning means and its elements are substantially identical and have been described hereinbefore. It is noted that the bars 73 are of greater length than the screen 74 and have their upper and lower ends projecting therebeyond. An external, annular band or collar 76 surrounds and connects the lower ends of the bars below the screen for closing the space between the lower ends of the cylinder and screen. Although the upper ends of the bars are connected by the partition 72, if desired, an internal connecting band or collar 77 may be provided at the upper end of the cylinder. Instead of the guide 60 and its individual tracks 61, the cylinder 71 is provided with an internal, helical or spiral guide means or track 78 extending continuously from its upper to its lower end and intersecting the upright bars. The track is of greater width than the bars so as to extend inwardly thereof for supporting the head 59 of the nozzle 32 between its adjacent flights which are spaced in accordance with the height of the nozzle head to accommodate said head therebetween. It is readily apparent that the track 78 guides the movement of the nozzle and causes its head to traverse the entire area of the screen upon rotation of the tube 33 by the rod 36 and its handle 38. Upright stops or members 79 are provided at the upper and lower ends of the track and extend between said ends and the underlying and overlying flights of said tracks for limiting the travel of the nozzle head. Since the track extends throughout the length of the cylinder beyond the ends of the screen, the bands 76 and 77 overlie the end portions of said track and their stops 79 and provide blank spaces for receiving the nozzle head. When the nozzle head is brought into engagement with its upper stop, the sleeve 34 is disengaged from the valve seat 44 and the sump 99 is flushed through the discharge opening 42. Manifestly, the entire area of the screen is exposed to the fluid when the nozzle head is disposed at the lower or upper end of the track within the band 76 or 77.

Another similar fluid strainer 80 is shown in Fig. 16 and includes a removable cylinder 81 similar to the cylinder 71. The cylinder includes an imperforate upper portion or cylindrical partition 82, upright supporting members or bars 83, a screen or foraminous element 84 encircling the bars and an internal, continuous, helical guide means or track 85 having upright stops or members 86 at its upper and lower ends. An opening 87 is formed in the partition 82 for the collar 23 and, as shown by the numeral 88, said partiton may be inwardly offset or recessed opposite the outlet opening 27 to increase the flow area of the adjacent portion of the annular chamber 18. If desired, a collar 89, similar to the collar 14, may be made integral with the upper end of the cylindrical wall 11 for connection by the bolts and studs 15 and engagement with an overlying flat head 90, similar to the head 13. For coaxial engagement with the upper end of the cylindrical partition and supporting a sealing ring 91 in engagement with the collar 89, an annular member or ring 92 may depend from the underside of the head 90. The cleaning means and its elements are substantially identical with the exception of a modified nozzle 93 which is substantially C-shaped and which has a pair of spaced, superimposed heads 94, similar to the head 59, with one or more flights of the continuous track 85 interposed therebetween. An arcuate upstanding arm 95 connects the upper head to the base of the nozzle, while the lower head is carried by the outer end of a substantially L-shaped arm 96 depending from said nozzle base. Due to the provision of the pair of heads 94, the entire area of the screen may be traversed in approximately one-half the revolutions and time of a nozzle having a single head. An external band or collar 97, similar to the collar 76, encircles and connects the lower ends of the bars 83 below the screen 84 in overlying relation to the lower end portion of the track 85 and its lower stop 86 so as to close the space between the lower ends of the cylinder 81 and screen. Since the lower portion of the partition 82 surrounds the upper ends of the bars and overlies the upper end portion of the track and its upper stop, the internal band 77 is not essential. Of course, only one of the nozzle heads may be positioned out of communication with the screen at a time. When the upper nozzle head is brought into engagement with the upper stop 86, the sleeve 34 is lifted off the valve seat 44 allowing a complete flushing of the sump 99. It is noted that the cylinder 81 as well as the cylinder 71 is readily removable in the same manner as the cylinder 16 and that the operation of the several embodiments of the invention is substantially identical.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid strainer including a closed vessel having an inlet and an outlet, a cylindrical strainer element in the vessel in direct communication with the inlet, cleaning means for reversing the flow through the strainer element comprising nozzle means communicating with and movable longitudinally and circumferentially over the inner surface of said element, means for imparting movement to the nozzle means, and guide means in said element and engageable by said nozzle means for directing the movement of said nozzle means.

2. A fluid strainer as set forth in claim 1 wherein the guide means includes a track having flights for receiving the nozzle means therebetween and extending throughout the length of the strainer element whereby said nozzle means traverses the entire area of said element.

3. A fluid strainer as set forth in claim 1 wherein the guide means includes a continuous track extending throughout the length of the strainer element whereby the nozzle means traverses the entire area of said element.

4. A fluid strainer as set forth in claim 1 wherein the guide means includes a plurality of superimposed track members extending transversely within the strainer element for receiving the nozzle means therebetween, the track members having openings establishing communication therebetween, and means between said track members and adjacent the openings for directing said nozzle means through said openings to and from said track members.

5. A fluid strainer as set forth in claim 4 wherein the opening of each track is offset circumferentially of the openings of the other tracks.

6. In a fluid strainer having a closed vessel communicating with an outlet and a tubular strainer element in the vessel communicating with an inlet, a cleaning head movable longitudinally and circumferentially over the inner surface of the strainer element, conduit means connected to the cleaning head and extending through one end of the element and exteriorly of the vessel, means for imparting movement to said head, and guide means within and extending throughout the element and engageable by said head for directing the movement of said head and causing traversal of the entire area of the element.

7. In a fluid strainer as set forth in claim 6 wherein the conduit means includes telescoping members with one of the members connecting the cleaning head to the movement imparting means.

8. In a fluid strainer as set forth in claim 6 wherein the guide means includes a track having adjacent communicating flights at the inner surface of the strainer element for receiving the cleaning head therebetween.

9. In a fluid strainer as set forth in claim 6 wherein the strainer element includes an imperforate portion for receiving the cleaning head when said head is not in use.

10. In a fluid strainer as set forth in claim 6 wherein the guide means includes a continuous helical track at the inner surface of the strainer element.

11. In a fluid strainer as set forth in claim 10 wherein the strainer element, includes imperforate and perforated portions overlying the track whereby the cleaning head may be disposed in the imperforate portion when not in use.

12. In a fluid strainer having an upright closed vessel communicating with an outlet and a tubular strainer element in the vessel having an inlet communicating with its upper portion, a pair of spaced superimposed cleaning heads movable longitudinally and circumferentially over the inner surface of the strainer element, a conduit connecting the heads and extending through one end of the element and communicating with the exterior of the vessel, means for imparting movement to the conduit to move said heads, means controlling flow through the conduit, and guide means within and extending throughout the element and engageable by said heads for directing the movement of said heads and causing traversal of the entire area of the element.

13. In a fluid strainer as set forth in claim 12 wherein the conduit includes telescoping members.

14. In a fluid strainer as set forth in claim 12 wherein the guide means includes a continuous helical track at the inner surface of the element.

15. In a fluid strainer, the combination with an upright closed tank having an outlet and a tubular strainer element in the tank having an inlet at its upper portion and a cylindrical screen at its lower portion, of a cleaning head movable longitudinally and circumferentially over the inner surface of the screen, a conduit extending from the head through one end of the screen and communicating with the exterior of the vessel, means controlling flow through the conduit, means for imparting axial and rotative movement to said conduit to move said head, a plurality of annular guide rings at the inner surface of the screen and extending transversely thereof in superimposed relation for receiving said head for rotative movement therebetween, the guide rings having communicating openings to permit movement of said head from one ring to another, the openings being offset circumferentially of one another in sequential relation whereby said head is in position for movement through one of said openings upon completion of a revolution between adjacent rings, and means at and between the ends of said openings for stopping rotation of and directing said head therethrough.

16. A fluid strainer including an upright closed vessel having an inlet and an outlet in its upper portion, a tubular strainer element in the vessel with its upper portion in direct communication with the inlet, partition means at the intermediate portion of said vessel and the lower end of the strainer element providing a chamber above the partition means between said vessel and cylinder, the chamber being in direct communication with the outlet, the lower portion of said vessel communicating with the lower end of said element and providing a chamber for receiving and accumulating foreign matter dropped out of the fluid, said partition means preventing direct communication between the chambers, a cleaning head movable over the inner surface of said element, conducting means extending from the head through the lower end of said element and through the accumulation chamber, the conducting means including a pair of telescoping members with one of the members connected to said head, said accumulation chamber having an outlet communicating with and engageable by the other telescoping member to provide valve means for controlling the discharge of foreign matter from said chamber, and means for imparting movement to the first mentioned telescoping member to move said head and said other telescoping member to open the valve means.

References Cited in the file of this patent

UNITED STATES PATENTS

| | | |
|---|---|---|
| 1,130,725 | Getts | Mar. 9, 1915 |
| 1,340,599 | Clarke | May 18, 1920 |
| 1,508,480 | Skinner | Sept. 16, 1924 |
| 1,510,863 | Rose | Oct. 7, 1924 |
| 1,689,277 | Burns | Oct. 30, 1928 |
| 1,819,602 | Hughes | Aug. 18, 1931 |
| 1,945,839 | Von Maltitz | Feb. 6, 1934 |
| 1,950,466 | Wille et al. | Mar. 13, 1934 |
| 2,066,479 | MacIsaac | Jan. 5, 1937 |
| 2,173,060 | Andrews | Sept. 12, 1939 |
| 2,606,663 | Blackman | Aug. 12, 1952 |
| 2,714,511 | Derrig | Aug. 2, 1955 |